United States Patent
Donovan (12)

(10) Patent No.: US 6,235,334 B1
(45) Date of Patent: May 22, 2001

(54) NO FAT, NO CHOLESTEROL CAKE AND PROCESS OF MAKING THE SAME

(76) Inventor: Margaret Elizabeth Donovan, 5738 S. Malta St., Aurora, CO (US) 80015

( * ) Notice: Subject to any disclaimer, the term of this patent is extended or adjusted under 35 U.S.C. 154(b) by 0 days.

(21) Appl. No.: 07/959,995

(22) Filed: Oct. 13, 1992

(51) Int. Cl.$^7$ .................................................... A21D 10/04
(52) U.S. Cl. ...................... 426/551; 426/120; 426/128; 426/549; 426/552; 426/555; 426/556
(58) Field of Search .................................... 426/549, 556, 426/555, 128, 120, 551, 552

(56) References Cited

U.S. PATENT DOCUMENTS

| | | |
|---|---|---|
| 2,845,356 | 7/1958 | Battiste . |
| 3,144,341 | 8/1964 | Thompson . |
| 3,493,387 | 2/1970 | Swcklik . |
| 3,959,499 | 5/1976 | Harris . |
| 4,185,127 | 1/1980 | Radlove . |
| 4,277,504 | 7/1981 | Radlove . |
| 4,351,852 | 9/1982 | Rule . |
| 4,379,174 | 4/1983 | Radlove . |
| 4,431,681 * | 2/1984 | Hegedus et al. ...................... 426/551 |
| 4,442,132 | 4/1984 | Kim . |
| 4,451,490 | 5/1984 | Silverman . |
| 4,503,083 | 3/1985 | Glicksman . |
| 4,526,799 | 7/1985 | Glicksman . |
| 4,752,495 | 6/1988 | Smith . |
| 4,803,086 * | 2/1989 | Hedenberg ........................... 426/120 |
| 4,971,823 * | 11/1990 | Fahlen .................................. 426/549 |
| 5,000,974 | 3/1991 | Albersmann . |
| 5,260,087 * | 11/1993 | Stad ..................................... 426/615 |
| 5,384,139 * | 1/1995 | Vasseneix ............................. 426/128 |

OTHER PUBLICATIONS

Samuel A. Matz, PH.D.; Formulas and Processes for Bakers, Pan–Tech International, Inc. 1987, pp. 102–105.*

California Prune Board Research Report, pp 1–7. Utilization of Dried Plums in Reduced–Fat Cholesterol–Free Bakery Products, 1992.*

Dobbin et al. Low Cholesterol Diet, Doubleday & Co. Inc 1951 N.Y p 242.*

Black, The Low Calorie Cookbook, Galahad Books, N.Y. 1962 pp. 150–151.*

Entenmann's Takes the Cake, Judith S. Riddle in Supermarket News, Monday Mar. 9, 1992.

Dried Plum (Prune) Puree recipe, California Prune Board California Prune Board Food Technology Technical Bulletin "Dried Plums: A Natural Preservative Improvement", Feb., 1992.

PruneTec California Prune Board Plum Line . . . "Malic Acid . . . Dried Plum's Natural Secret To Superior Flavor" Nov., 1992.

California Prune Board Technical Bulletin, Sep., 1993.

California Prune Board Food Technology Marketing Bulletin "Dried Plums Naturally Reduce Fat And Improve Consumer Perception" Rev. Jan., 1993.

PruneTec California Prune Board Food Technology Plum Line . . . "Multi–Functional Dried Plums: The Natural Way To N.L.E.A. Compliance", Jul., 1993.

California Prune Board Food Technology Marketing Bulletin "New Rules . . . " Aug., 1993.

California Prune Board Food Technology Technical Bulletin "The Do's And Don'ts For Making Reduced Fat Baked Goods Using Dried Plums", Sep., 1993.

American Society of Bakery Engineers Bulletin No. 228 "Dried Plums: A Multi–Functional Bakery Ingredient", By Scott W. Sanders, Ph.D., Sep., 1993.

California Prune Handlers , Apr., 1994.

\* cited by examiner

*Primary Examiner*—Helen Pratt
(74) *Attorney, Agent, or Firm*—Ramon L. Pizarro

(57) ABSTRACT

A no fat, no cholesterol cake possesses a dry premix component, containing on a volumetric percentage basis, of about 52.4% flour, 46.6% sugar, and 1% baking soda. Egg whites and various wet mix ingredients are added to the dry premix to produce a variety of different cakes. In each instance, the wet mix includes an acidic component of fruit and/or fruit juice which reacts with the baking soda to leaven the cake. The fruits and/or fruit juices which may be used include pineapple, orange, cranberry, apple, lemon, and cherry. Natural flavoring ingredients including raisins, dates, bananas, carrots, zucchini, apricots, non-fat yogurt, cinnamon, nutmeg, ginger, cloves, and vanilla may also be employed. No shortening, fillers, or unnatural ingredients are utilized.

9 Claims, No Drawings

NO FAT, NO CHOLESTEROL CAKE AND PROCESS OF MAKING THE SAME

BACKGROUND OF THE INVENTION

The present invention relates to cakes, and more particularly pertains to an improved no fat, no cholesterol cake. For health reasons, there is an increasing interest in no fat and no cholesterol bakery products. In order to produce such products, particularly cakes, the prior art has proposed various cake mixes in which the conventional shortening components are replaced with alginate and other fillers and chemicals. Many individuals have found such chemical and filler laden cakes to be unacceptable, both for reasons of their unnatural ingredients, as wells as for their poor taste and mouth feel. Accordingly, there is an interest in and need for an improved no fat, no cholesterol cake consisting entirely of natural ingredients, and possessing good flavor and mouth feel characteristics.

SUMMARY OF THE INVENTION

In order to achieve these and other objects of the invention, the present invention provides an improved no fat, no cholesterol cake which includes a dry premix component, consisting, on a volumetric percentage basis, of about 52.4% flour, 46.6% sugar, and 1% baking soda. Egg whites and various wet mix ingredients are added to the dry premix to produce a variety of different cakes. In each instance, the wet mix includes an acidic component consisting of fruit and/or fruit juice which reacts with the baking soda to leaven the cake. The fruits and/or fruit juices which may be used include pineapple, orange, cranberry, apple, lemon, and cherry. Natural flavoring ingredients including raisins, dates, bananas, carrots, zucchini, apricots, non-fat yogurt, cinnamon, nutmeg, ginger, cloves, and vanilla may also be employed. No shortening, fillers, or unnatural ingredients are utilized.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

For the purposes of this disclosure and the appended claims, the terms "no fat" and "no cholesterol" are used as defined by the U.S. Food and Drug Administration. A food product may be labeled as "no fat" pursuant to U.S. Food and Drug Administration regulations if it does not contain more than 0.5 grams of fat per 100 grams. A food product may be labeled as "no cholesterol" pursuant to U.S. Food and Drug Administration regulations if it does not contain more than 2 mg. of cholesterol per 100 grams.

A dry premix used as a starting mixture for making each of the example cakes according to the present invention consists of:

DRY PREMIX 2.25 cups of flour 2.00 cups of sugar 2.00 teaspoons of baking soda Thus, on a volumetric basis, the dry premix consists of 54 parts flour, 48 parts sugar and 1 part baking soda, or on a volumetric percentage basis, of about 52.4% flour, 46.6% sugar, and 1% baking soda. While the above flour, sugar, baking soda ratio is preferred, the ratio may be varied in the ranges 45% to 55% flour, 40% to 50% sugar, and 0.5% to 2.5% baking soda, without departing from the scope of the present invention.

In each instance, the wet mix includes an acidic component consisting of fruit and/or fruit juice which reacts with the baking soda to leaven the cake. No shortening, fillers, or unnatural ingredients are employed.

To the dry premix, along with the other wet mix ingredients specified in the examples below, four (4) egg whites are added to form a cake batter. As an alternative to fresh egg whites, an equivalent quantity of egg white solids may also be employed, and thus egg white solids are considered to be within the scope of the term "egg whites" as employed in the appended claims. The content breakdown of the dry premix combined with the four (4) egg whites are specified in the table below:

CONTENT BREAKDOWN

Weight: 786.25 grams

Calories: 2506.25

Cholesterol: 0.0

Fat: 2.025 grams total, 0.2576 grams fat/100 grams

Various wet mix ingredients to be added to the dry premix to make various different example cakes according to the present invention are set forth below. In each instance, the wet mix includes an acidic component consisting of fruit and/or fruit juice which reacts with the baking soda to leaven the cake. The fruits and/or fruit juices which may be used include pineapple, orange, cranberry, apple, lemon, and cherry. Natural flavoring ingredients including raisins, dates, bananas, carrots, zucchini, apricots, non-fat yogurt, cinnamon, nutmeg, ginger, cloves, and vanilla may also be employed. No shortening, fillers, or unnatural ingredients are utilized. In each example, the listed ingredients are added to the dry premix along with the four (4) egg whites.

EXAMPLE 1

The Original

Add to the dry premix and four (4) egg whites:

1 twenty (20) ounce can of crushed pineapple 1.0 cup of raisins

CONTENT BREAKDOWN

Weight: 1561.25 grams

Calories: 3331.25

Cholesterol: 0.0

Fat: 3.275 grams total, 0.2097 grams fat/100 grams

EXAMPLE 2

The Date Cake

Add to the dry premix and four (4) egg whites:
2.0 cups of crushed pineapple
1.0 cup of finely chopped dates

CONTENT BREAKDOWN

Weight: 1369.25 grams
Calories: 3326.00
Cholesterol: 0.0
Fat: 2.425 grams total, 0.1771 grams fat/100 grams

EXAMPLE 3

The Hawaiian

Add to the dry premix and four (4) egg whites:
1.0 cup of crushed pineapple
2 medium spotted, mashed bananas (approx. 1 cup)
1.0 cup of orange juice

CONTENT BREAKDOWN

Weight: 1531.25 grams
Calories: 2978.25
Cholesterol: 0.0
Fat: 3.525 grams total, 0.2329 grams fat/100 grams

EXAMPLE 4

The Cranberry

Add to the dry premix and four (4) egg whites:
1.0 cup of orange juice
0.5 cup of crushed or chopped cranberries

CONTENT BREAKDOWN

Weight: 1130.25 grams
Calories: 2664.25
Cholesterol: 0.0
Fat: 2.325 grams total, 0.2057 grams fat/100 grams

EXAMPLE 5

The Cran-Raspberry

Add to the dry premix and four (4) egg whites:
1.5 cups of cran-raspberry drink (Ocean Spray®)
0.5 cup crushed/chopped cranberries

CONTENT BREAKDOWN

Weight: 833.75 grams
Calories: 2749.75
Cholesterol: 0.0
Fat: 2.275 grams total, 0.2728 grams fat/100 grams

EXAMPLE 6

The Zucchini Cake

Add to the dry premix and four (4) egg whites:
1.5 cups shredded zucchini
1.5 cups crushed pineapple
1.0 cup raisins
1.0 teaspoon cinnamon

CONTENT BREAKDOWN

Weight: 1508.25 grams
Calories: 3214.25
Cholesterol: 0.0
Fat: 3.475 grams total, 0.2304 grams fat/100 grams

EXAMPLE 7

Apricot Supreme

Add to the dry premix and four (4) egg whites:
1.0 cup crushed pineapple
1.0 cup dried finely chopped apricots
0.5 cup non-fat yogurt (blend with apricots)

CONTENT BREAKDOWN

Weight: 1106.25 grams
Calories: 2877.25
Cholesterol: 2.5 mg total, 0.00226 mg cholesterol/100 grams
Fat: 2.625 grams total, 0.2373 grams fat/100 grams

EXAMPLE 8

Apple Strudel

Add to the dry premix and four (4) egg whites:
0.5 cup chopped dried apples (soaked in apple juice)
0.5 cup apple juice
0.25 cup apple sauce
1.0 cup raisins
1.0 teaspoon cinnamon

CONTENT BREAKDOWN

Weight: 1251.25 grams
Calories: 3357.25
Cholesterol: 0.0
Fat: 3.925 grams total, 0.3136 grams fat/100 grams

EXAMPLE 9

The Carrot Cake

Add to the dry premix and four (4) egg whites:
1.5 cup grated carrots
1.5 cup pineapple
1.0 cup raisins
2.0 teaspoons cinnamon
1.0 teaspoon nutmeg
0.75 teaspoon ginger
1.0 teaspoon cloves

CONTENT BREAKDOWN

Weight: 1535.25 grams
Calories: 3303.75
Cholesterol: 0.0
Fat: 5.425 grams total, 0.3533 grams fat/100 grams

EXAMPLE 10

The Chocolate Covered Cherry Cake

Add to the dry premix and four (4) egg whites:
3.0 tablespoons cocoa (stir into dry premix)
2.0 cups cherry pie filling (Wilderness0)

CONTENT BREAKDOWN

Weight: 1254.58 grams
Calories: 3127.25
Cholesterol: 0.0
Fat: 5.025 grams total, 0.4005 grams fat/100 grams
Suitable example glazes for use as a frosting for cakes according to the present invention consists of the ingredients set forth in the following tables:

GLAZE I 1.0 tablespoon non-fat yogurt
0.25 teaspoon vanilla
0.25 teaspoon lemon juice
0.5 to 0.75 cup of powdered sugar

CONTENT BREAKDOWN

Weight: 104.19 grams
Calories: 353.375
Cholesterol: 0.3125
Fat: 0.0 grams total

GLAZE II 1.0 tablespoon non-fat yogurt
1.0 tablespoon cherry pie filling (cut cherries in small pieces)
0.50 teaspoon almond extract
0.75 to 1.0 cup of powdered sugar
Glaze II is intended for use in conjunction with the chocolate covered cherry cake (Example 10).

The amount of powdered sugar in Glaze I and Glaze II depends upon ambient humidity. The proper amount of powdered sugar is added to achieve a consistency such that the glaze will still flow fairly readily in a manner to actually drip off the cake.

Each of the example cakes listed above are made by adding the egg whites and listed wet mix ingredients to the dry premix and stirring. The baking pan, preferably a bundt-type cake pan, is sprayed with a non-stick cooking spray such as Mazola® no stick spray, the cake batter is then added, and baked in an oven for 30 to 55 minutes (depending on the cake variety) at a temperature of 350 degrees Fahrenheit, until the cake is golden brown and an inserted tooth pick comes out clean. All of the example cakes are baked in a 6 inch or 10 inch bundt-type cake pan.

The specific example cakes described above are illustrative only, and manner other specific flavors and varieties may be developed within the scope of the present invention. Other example flavors include raspberry, banana-split, lemon-berry, peach, and pumpkin-apple. In each variety, the cake will include the dry premix along with wet mix ingredients including an acidic fruit and/or fruit juice to react with the baking soda to leaven the cake.

As can now be readily appreciated, the cake according to the present invention is susceptible to commercial marketing in many varieties, in the form of a dry premix component, which may be packaged in a sack or similar package, and a wet mix component including fruit and/or fruit juices and flavoring ingredients, which may be packaged in a jar, can, waterproof bag, or similar package. The consumer may be instructed to provide fresh egg whites, or egg white solids may be included in the dry mix component. A common dry premix package may be associated with various different wet mix packages resulting in economical production and packaging, and thus making the cake mix affordable to the consuming public. The cake may of course also be marketed in ready to eat fresh and frozen forms.

It is to be understood, however, that even though numerous characteristics and advantages of the present invention have been set forth in the foregoing description, together with details of the structure and function of the invention, the disclosure is illustrative only, and changes may be made in detail, within the principles of the invention to the full extent indicated by the broad general meaning of the terms in which the appended claims are expressed.

What is claimed is:

1. A method for making a leavened, no fat, no cholesterol batter based cake, the method comprising:

assembling a dry mixture consisting of:
a volumetric proportion of:
approximately 52 percent flour;
approximately 46 percent sugar; and
approximately one percent baking soda;
providing egg whites to be added to the dry mixture.

2. A method according to claim 1 and further comprising adding acidic fruit juice during the step of mixing.

3. A method according to claim 1 and further comprising adding flavoring ingredients during the step of mixing, the flavoring ingredients being selected from the group consisting of: raisins, dates, bananas, carrots, zucchini, apricots, non-fat yogurt, cinnamon, nutmeg, ginger, cloves, and vanilla.

4. A method for making a leavened, no fat, no cholesterol batter based cake, the method comprising:

providing a dry mixture consisting of:
a volumetric proportion of:
approximately 52 percent flour;
approximately 46 percent sugar; and
approximately one percent baking soda;
providing egg whites;
providing an acidic component consisting of crushed or shredded acidic fruit to the batter mixture to obtain a cake batter mixture of at least about thirty percent by weight of crushed or shredded acidic fruit having acidic juice, the crushed or shredded acidic fruit being selected from the group consisting of crushed pineapple, chopped dates and an acidic juice, chopped cranberries and an acidic juice, chopped apricots and an acidic juice, chopped apples, grated carrots and an acidic juice, and cherry pie filling;
then mixing the egg whites, the crushed or shredded acidic fruit, and the dry mixture to cause a reaction between the acidic juice of the fruit to produce a uniformly leavened batter mixture.

5. A method according to claim 4, and further comprising adding flavoring ingredients during the step of mixing, the flavoring ingredients being selected from the group consisting of: raisins, dates, bananas, carrots, zucchini, apricots, non-fat yogurt, cinnamon, nutmeg, ginger, cloves, cocoa and vanilla.

6. A method according to claim 4 and further comprising adding acidic fruit juice during the step of mixing.

7. A leavened, no fat, no cholesterol batter based cake, manufactured by the method comprising:

providing a dry mixture consisting of:
a volumetric proportion of:
approximately 52 percent flour;

approximately 46 percent sugar; and approximately one percent baking soda;

providing egg whites;

providing crushed or shredded acidic fruit to the batter mixture to obtain a cake batter mixture of at least about thirty percent by weight of crushed or shredded acidic fruit; the crushed or shredded acidic fruit being selected from the group consisting of crushed pineapple, chopped dates and an acidic juice, chopped cranberries and an acidic juice, chopped apricots and an acidic juice, chopped apples, grated carrots and an acidic juice, and cherry pie filling.

8. A cake according to claim 7, and further comprising adding acidic fruit juice during the step of mixing.

9. A cake according to claim 7 and further comprising adding flavoring ingredients during the step of mixing, the flavoring ingredients being selected from the group consisting of: raisins, dates, bananas, carrots, zucchini, apricots, non-fat yogurt, cinnamon, nutmeg, ginger, cloves, and vanilla.

\* \* \* \* \*